United States Patent [19]

Stanek

[11] Patent Number: 4,949,430
[45] Date of Patent: Aug. 21, 1990

[54] METHOD AND APPARATUS FOR COATING A FOOD PRODUCT CASING

[75] Inventor: Thomas G. Stanek, Smyrna, Ga.

[73] Assignee: W. R. Grace & Co.-Conn., Duncan, S.C.

[21] Appl. No.: 409,485

[22] Filed: Sep. 19, 1989

[51] Int. Cl.$^5$ .............................................. A22C 11/02
[52] U.S. Cl. ...................................... 17/41; 17/51; 17/49; 17/35
[58] Field of Search .................... 17/51, 41, 33–36, 17/49

[56] References Cited

U.S. PATENT DOCUMENTS

| 3,473,190 | 10/1969 | Kielsmeier et al. | 17/35 |
|---|---|---|---|
| 4,307,489 | 12/1981 | Niedecker | 17/51 |
| 4,439,890 | 4/1984 | Kazaitis | 17/41 |
| 4,817,244 | 4/1989 | Townsend | 17/51 |

FOREIGN PATENT DOCUMENTS 2908496  9/1980  Fed. Rep. of Germany .......... 17/51

*Primary Examiner*—Willis Little
*Attorney, Agent, or Firm*—John J. Toney; William D. Lee, Jr.; Jennifer L. Skord

[57] ABSTRACT

A stuffing horn includes a cylindrical sleeve in which a least one channel located within the sleeve provides for the transfer of liquid additive from a liquid source to the outer extremity of the stuffing horn. Atomizers in the outer face of the horn provide a means of transferring the liquid additive from the horn onto the interior of a food-product thermoplastic container such as a casing or bag. The liquid additive, such as liquid smoke or colorant, is then transferred to the exterior surface of the stuffed meat product.

5 Claims, 2 Drawing Sheets

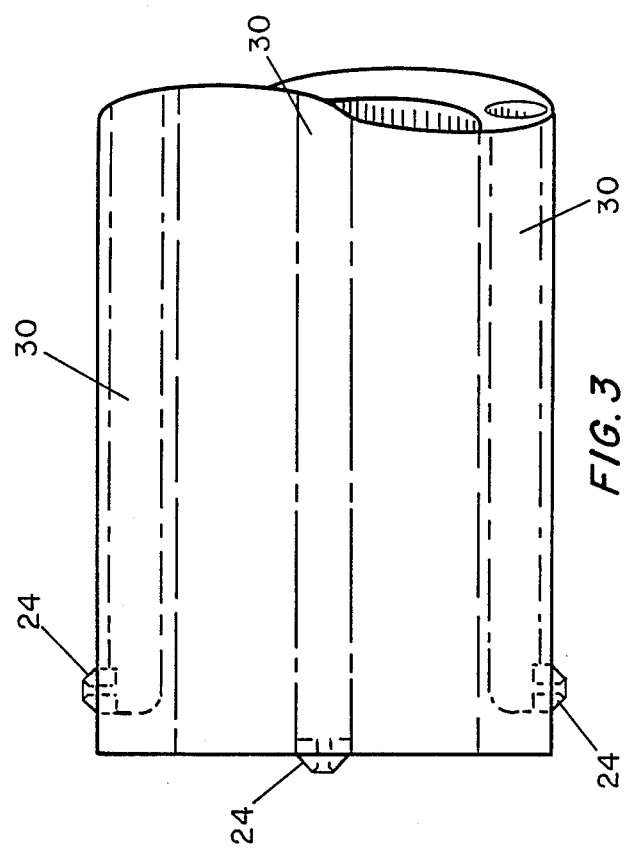
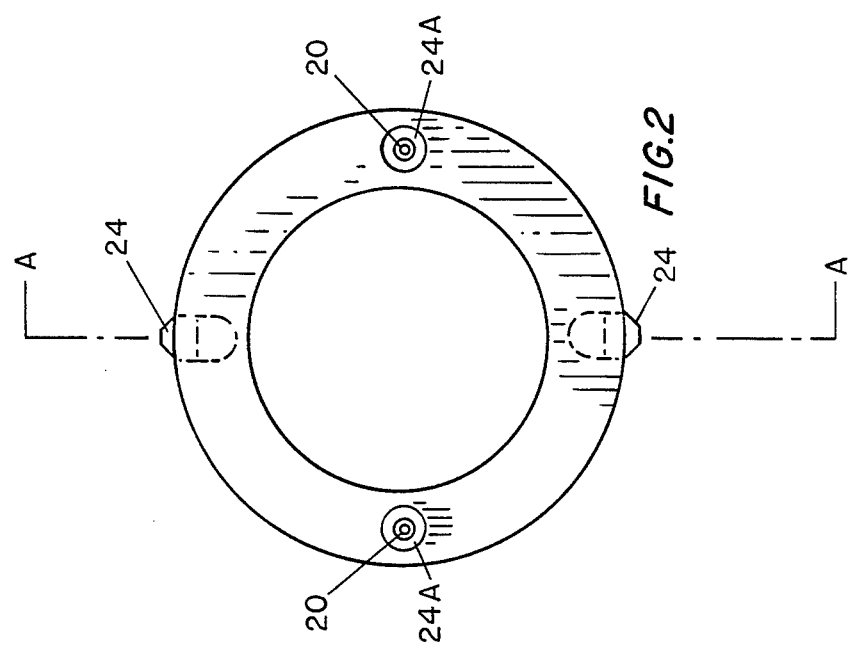

METHOD AND APPARATUS FOR COATING A FOOD PRODUCT CASING

FIELD OF THE INVENTION

The present invention relates to a stuffing horn, and more particularly to a stuffing horn for casings or bags in which liquid smoke or colorants may be introduced to the interior of a food casing.

BACKGROUND OF THE INVENTION

It is well known in the food packaging art to stuff synthetic or cellulosic, flexible tubular casings or to stuff flexible thermoplastic bags with various meat products. Casings and bags are collectively herein referred to as "flexible thermoplastic containers". These meat products are typically processed and introduced into the casings or bags in the form of an emulsion or comminuted form.

In automated processes, processed meat products are introduced into a casing which may be unshirred, but such meat products are typically introduced into a shirred casing. This is a casing which is shirred to a much shorter length than the actual length of the casing. As the automated process is operated, the shirred casing is fed typically over a sizing ring which unshirres the casing before stuffing with the meat product. Of course, the diameter of the sizing ring will be predetermined in accordance with the size of the intended casing which will be used for the particular packaging operation. Such a process and apparatus is discussed in copending U.S. Ser. No. 282,794 filed Dec. 9, 1988 to inventor Stanek, the disclosure of which is incorporated herein by reference.

Also stuffing is done into flexible thermoplastic bags. An apparatus for such processes is sold under the trade name Furakawa 8150 vacuum meat stuffing apparatus. The 8150 is described in U.S. Pat. No. 4,586,320, the disclosure of which is incorporated herein by reference.

It is also common practice to introduce liquid smoke, colorant, disinfectant or other similar additives to certain processed meat products such as sausage or luncheon meats to impart the desired flavor or color or bactericide to the food product. These additives are usually blended into the food product before the stuffing operation, or impregnated into the bag or casing material itself if the composition of the plastic permits impregnation of such additives.

This general practice requires an additional step prior to the stuffing operation. In the instance of pre-blending the colorant or liquid smoke into the food product, sometimes more additive is used than is really required. For example, if only the surface of the food product requires the colorant or liquid smoke, pre-blending uses excess additive which is blended throughout the food product.

Additionally, in the instance of some synthetic casings, liquid smoke and colorant are not easily added to the polymeric pellet feed when manufacturing the casing material itself, and if added are not readily retained by the casing material.

For these reasons, it is desirable to provide a method and apparatus for coating the interior of a flexible thermoplastic container for packaging a processed meat product, which does not require the pre-blending of the additive into the meat before the stuffing operation, or impregnation of the plastic material itself with the additive.

SUMMARY OF THE INVENTION

In one aspect of the invention, in a stuffing horn suitable for use with a tubular casing, the stuffing horn comprising a cylindrical sleeve having an outer diameter substantially corresponding to the inside diameter of the casing, and two parallel, lateral faces defining the lateral thickness of the sleeve, the improvement comprises at least one channel within the sleeve, the channel having a first end and a second end, the first end terminating in an orifice at one of the lateral faces of the sleeve, and an atomizer located at an outer extremity of the sleeve, in communication with the second end of the channel, and intermediate the lateral faces of the sleeve.

In another aspect of the invention, in a stuffing apparatus suitable for use with a flexible, thermoplastic container, the apparatus comprising a stuffing horn having:
an outer diameter substantially corresponding to the inside diameter of the container, the improvement comprising:
(a) at least one channel integral with the stuffing horn, said channel having a first end and a second end, the first end terminating in an orifice; and
(b) an atomizer located at an outer extremity of and in communication with the second end of the channel.

In still another aspect, the present invention involves a method of coating a food-product flexible, thermoplastic container with a liquid comprising:
(a) delivering the liquid through a delivery means integral with a stuffing horn;
(b) delivering the liquid from the delivery means to an atomizer located at the outer extremity of the stuffing horn;
(c) moving a thermoplastic container over the stuffing horn such that liquid is transferred to the interior surface of the thermoplastic container; and
(d) stuffing the thermoplastic container with a food product such that liquid on the interior surface of the thermoplastic container contacts the food product.

In yet another aspect of the present invention, in a stuffing horn suitable for use with a flexible, thermoplastic container, the stuffing horn comprising a cylindrical sleeve having
(i) an outer diameter substantially corresponding to the inside diameter of the container,
(ii) an inner diameter slightly greater than the outside diameter of the stuffing horn, and
(iii) two parallel, lateral faces defining the lateral thickness of the sleeve,
the improvement comprising:
(a) at least one channel within the sleeve, said channel having a first end and a second end, the first end terminating in an orifice at one of the lateral faces of the sleeve; and
(b) an atomizer located at an outer extremity of the sleeve, in communication with the second end of the channel, and intermediate the lateral faces of the sleeve.

BRIEF DESCRIPTION OF THE DRAWINGS

The invention may be further understood by reference to the following figure, drawings, given by way of illustration only:

FIG. 2 is an end view of the stuffing horn and atomizer of FIG. 1 along line A—A of FIG. 1;

FIG. 3 is a side view of the stuffing horn of FIG. 1.

DESCRIPTION OF THE PREFERRED EMBODIMENTS

Figure 1:
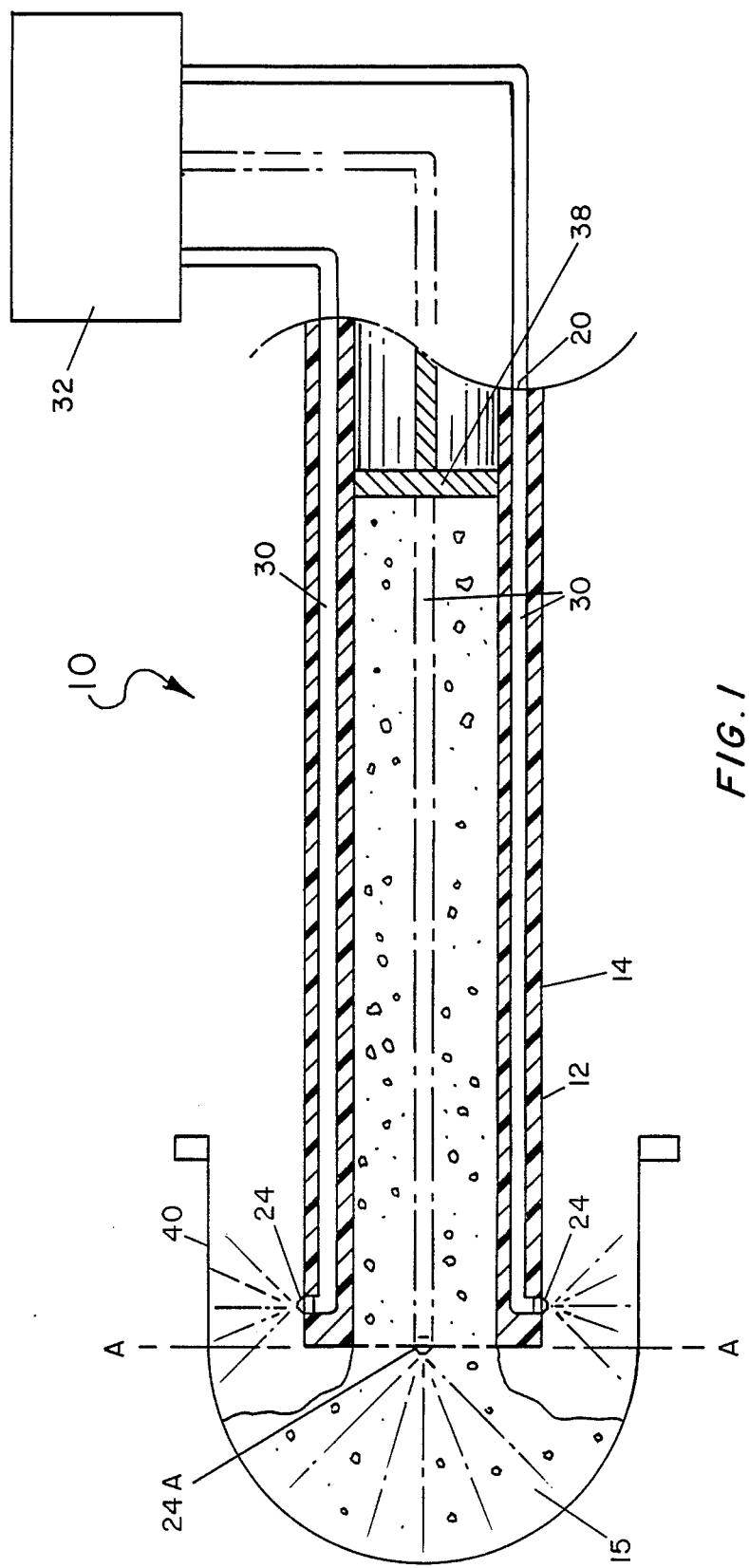
FIG. 1 is a schematic side view of the stuffing horn apparatus, atomizer, and method of the present invention.

Referring to FIG. 1, an apparatus for coating the inside of a meat emulsion casing with liquid smoke or colorant includes a stuffing horn 10 having a cylindrical portion 12, and sleeve 14.

The inventor has discovered that by introducing channels or tubes 30 integral with the stuffing horn, as indicated in FIG. 1 and in more detail in FIG. 3, the additives such as liquid smoke, colorant, disinfectant, or other materials may be passed through the channels and through the atomizers to the interior surface of flexible thermoplastic container 40. The casing or bag 40, as it and the horn pass each other, picks up the atomized colorant or other material as this material is deposited on the interior side of casing or bag 40. Some of this additive then transfers to the outer surface of the meat emulsion 15.

As seen in FIG. 1, the liquid source 32 supplies liquid smoke or other additives through channels or tubing 30 integral with the stuffing horn 10. The additive is then passed through one or more tubes 30 and up into an atomizer 24. The atomizer facilitates the transfer of the additive from the stuffing horn's exterior surface to the interior surface of the casing or bag 40 as it and the stuffing horn 10 are passing each other.

At the same time or after atomized spraying, the meat emulsion or other food product 15 to be stuffed into the casing or bag material is pushed forward by ram 38 and passes through the hollow core of the stuffing horn as is typical in the art.

In the event the plastic container used is a casing, the casing 40 may be unshirred, or alternatively shirred. A shirred casing itself is well known in the art, and various means have been devised to install sections of shirred casing onto stuffing horns, or alternatively onto a support which has in turn been installed on a stuffing horn. Those skilled in the art will readily recognize the adaptability of the present invention to various stuffing assemblies and apparatus.

The present invention will operate on the basis of a single tubing 30 delivering a liquid additive through a single orifice 20 to the atomizer 24. From there, the atomizer 24 will help to uniformly distribute the liquid additive. It is preferable that a plurality of tubing 30, orifices 20, and atomizers 24 are utilized to better distribute the liquid additive. In the preferred embodiment, four tubes 30, orifices 20, and atomizers 24 as described in FIG. 2 above are utilized, being distributed uniformly around the circumference of the stuffing horn, wherein atomizers 24, 24 are disposed for sideways spraying and atomizers 24A, 24A are disposed for downwards spraying.

Those skilled in the art will readily understand that other modifications may be utilized with varying success. For instance, the emulsion may be stuffed into flexible thermoplastic bags, instead of into casings. These and other modifications are therefore deemed to be within the spirit and scope of the claims as defined below.

What is claimed is:

1. In a stuffing horn suitable for use with a flexible, thermoplastic container, the stuffing horn comprising a cylindrical sleeve having
    (i) an outer diameter substantially corresponding to the inside diameter of the container,
    (ii) an inner diameter slightly greater than the outside diameter of the stuffing horn, and
    (iii) two parallel, lateral faces defining the lateral thickness of the sleeve, the improvement comprising:
    (a) at least one channel within the sleeve, said channel having a first end and a second end, the first end terminating in an orifice at one of the lateral faces of the sleeve; and
    (b) an atomizer located at an outer extremity of the sleeve, in communication with the second end of the channel, and intermediate the lateral faces of the sleeve.

2. In a stuffing apparatus suitable for use with a flexible, thermoplastic container, the apparatus comprising a stuffing horn having an outer diameter substantially corresponding to the inside diameter of the container, the improvement comprising:
    (a) at least one integral channel with the stuffing horn, said channel having a first end and a second end, the first end terminating in an orifice; and
    (b) an atomizer located at an outer extremity of and in communication with the second end of the channel.

3. A method of coating a food-product flexible, thermoplastic container with a liquid comprising:
    (a) delivering the liquid through a delivery means integral with a stuffing horn;
    (b) delivering the liquid from the delivery means to an atomizer located at an outer extremity of the stuffing horn;
    (c) moving a thermoplastic container and the stuffing horn such that the outer extremity of the stuffing horn is inside the thermoplastic container and liquid is transferred to the interior surface of the thermoplastic container; and
    (d) stuffing the thermoplastic container with a food product such that liquid on the interior surface of the thermoplastic container contacts the food product.

4. An apparatus for coating a food-product flexible, thermoplastic container with a liquid comprising:
    (A) a stuffing horn comprising a cylindrical sleeve having
        (i) an outer diameter substantially corresponding to the inside diameter of the thermoplastic container,
        (ii) inner diameter slightly greater than the outside diameter of the stuffing horn,
        (iii) two parallel, lateral faces defining the lateral thickness of the sleeve,
        (iv) east one channel within the sleeve, said channel having a first end and a second end, the first end terminating in an orifice at one of the lateral faces of the sleeve; and
        (v) an atomizer located at an outer extremity of the sleeve, in communication with the second end of the channel and intermediate the lateral faces of the sleeve; and
    (B) a means for delivering the liquid from a source of the liquid through the cylindrical sleeve to the atomizer.

5. The improvement according to claim 4 wherein the means for delivering the liquid is a first tube member which communicates with and extends from a source of the liquid to the interior of the cylindrical sleeve.

* * * * *

UNITED STATES PATENT AND TRADEMARK OFFICE
CERTIFICATE OF CORRECTION

PATENT NO. : 4,949,430

DATED : August 21, 1990

INVENTOR(S) : Thomas G. Stanek

It is certified that error appears in the above-identified patent and that said Letters Patent is hereby corrected as shown below:

In claim 4, at line 54 of column 4, change "east" to read as --at least--.

Signed and Sealed this

Seventeenth Day of March, 1992

Attest:

HARRY F. MANBECK, JR.

*Attesting Officer*      *Commissioner of Patents and Trademarks*